G. R. FESSENDEN, Jr.
ELECTRIC CIRCUIT PROTECTING APPARATUS.
APPLICATION FILED OCT. 1, 1913.

1,124,599.

Patented Jan. 12, 1915.

3 SHEETS—SHEET 1.

WITNESSES
Walter P. Geyer
M. Ray Taylor

INVENTOR
George R. Fessenden Jr.
by Geyer & Pohl
ATTORNEYS.

G. R. FESSENDEN, Jr.
ELECTRIC CIRCUIT PROTECTING APPARATUS.
APPLICATION FILED OCT. 1, 1913.
1,124,599.
Patented Jan. 12, 1915.
3 SHEETS—SHEET 2.
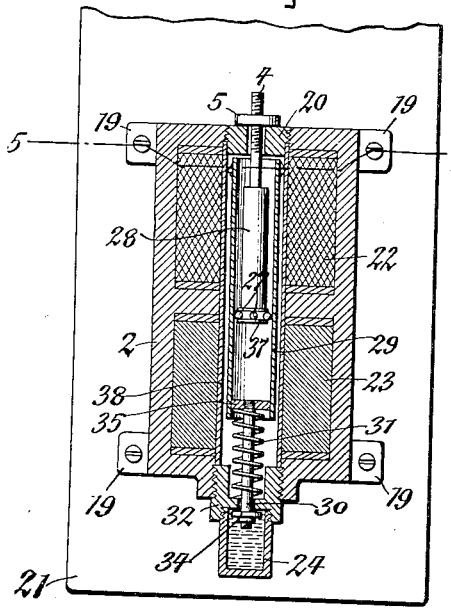
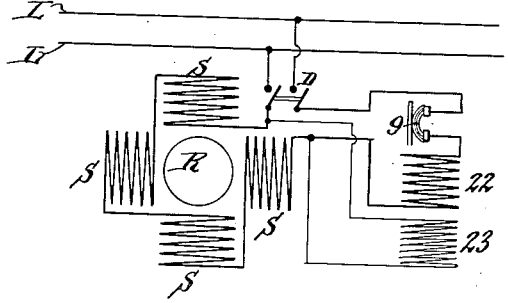
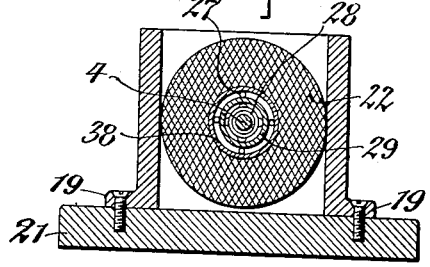
WITNESSES
Walter P. Geyer.
W. Ray Taylor
INVENTOR
George R. Fessenden Jr
by Geyer & Popp
ATTORNEYS.

G. R. FESSENDEN, Jr.
ELECTRIC CIRCUIT PROTECTING APPARATUS.
APPLICATION FILED OCT. 1, 1913.
1,124,599.
Patented Jan. 12, 1915.
3 SHEETS—SHEET 3.
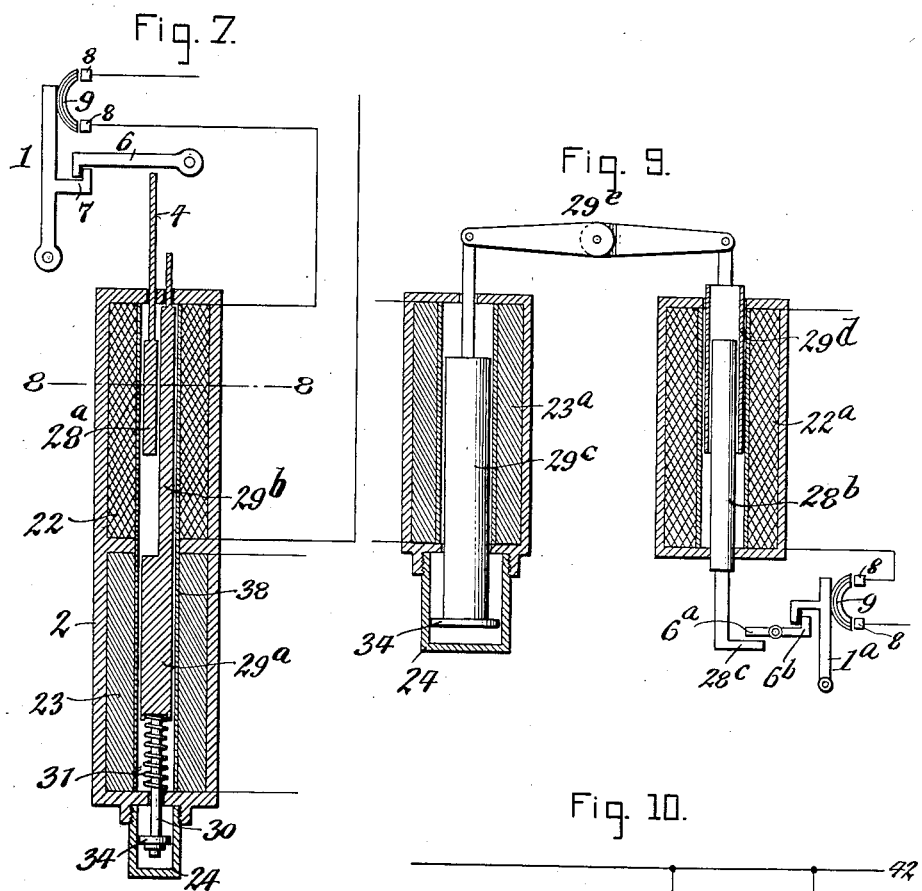
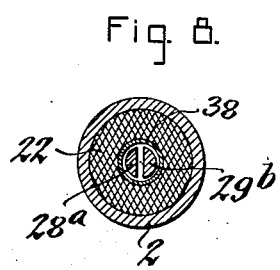
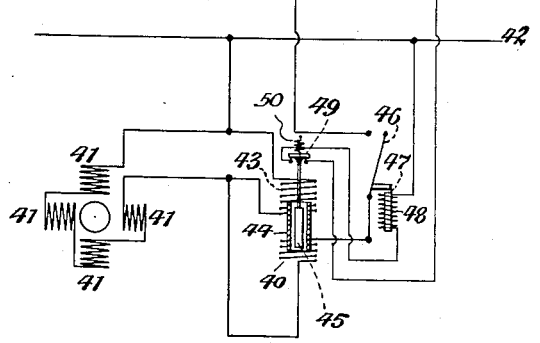
WITNESSES
Walter P. Geyer.
W. Ray Taylor.
INVENTOR
George R. Fessenden Jr
by Geyer & Papp
ATTORNEYS

UNITED STATES PATENT OFFICE.

GEORGE R. FESSENDEN, JR., OF LANCASTER, NEW YORK.

ELECTRIC-CIRCUIT-PROTECTING APPARATUS.

1,124,599.　　　　　Specification of Letters Patent.　　Patented Jan. 12, 1915.

Application filed October 1, 1913. Serial No. 792,693.

*To all whom it may concern:*

Be it known that I, GEORGE R. FESSENDEN, Jr., a citizen of the United States, residing at Lancaster, in the county of Erie and State of New York, have invented new and useful Improvements in Electric - Circuit- Protecting Apparatus, of which the following is a specification.

The object of this invention is the provision of an electric circuit protecting device which, when used in connection with electrical apparatus requiring a large starting current, as for example alternating current induction motors, will permit of a suitable overload protection for such apparatus during normal running conditions, and yet permit the initial rush of current up to a predetermined limit, to pass without actuating the circuit opening mechanism when starting the motor.

Figure 1:
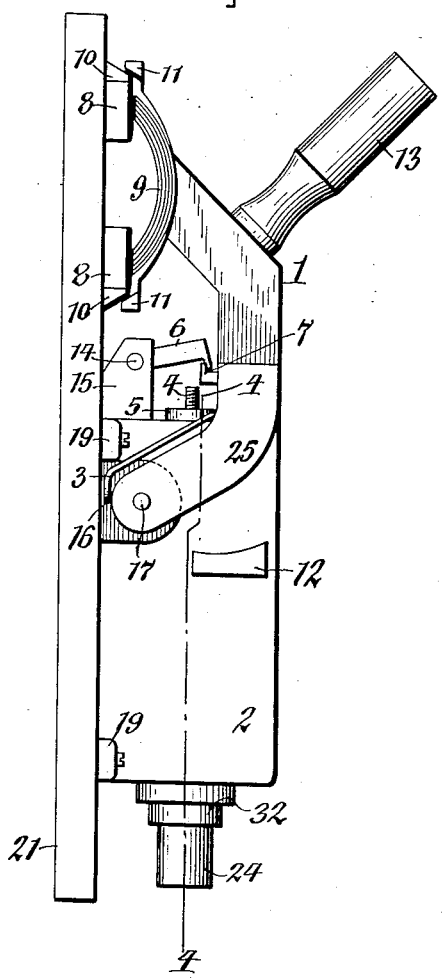
Figure 2:
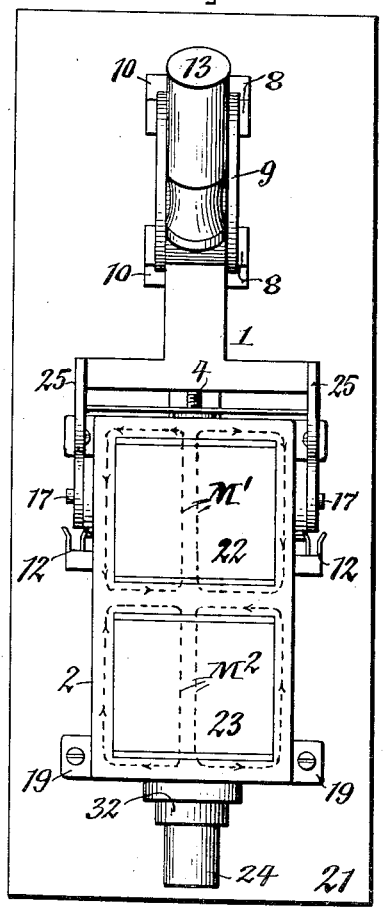
Figure 3:
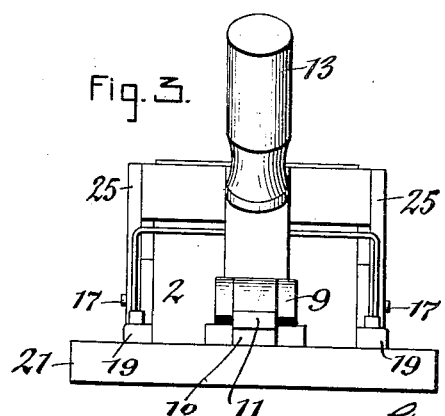

In the accompanying drawings: Figure 1 represents the side view of one form of apparatus embodying my invention. Fig. 2, the front view of the same. Fig. 3, is a top view thereof. Fig. 4 is a vertical section taken in line 4—4, Fig. 1. Fig. 5 is a horizontal section taken in line 5—5, Fig. 2. Fig. 6 shows diagrammatically the use of the device in connection with an induction motor. Fig. 7 is a fragmentary sectional elevation showing a modified form of my invention. Fig. 8 is a horizontal section thereof in line 7—7, Fig. 7. Fig. 9 is a sectional elevation showing another modification of my invention. Fig. 10 is a diagrammatic representation of still another form of apparatus embodying my invention.

Similar characters of reference indicate corresponding parts throughout the several views.

Referring to the structure shown in Figs. 1-5, 2 represents an iron frame 2, forming two independent magnetic circuits $M^1$ and $M^2$ in its upper and lower parts respectively. The releasing coil 22 of the upper circuit $M^1$ consists of a few turns of large wire; and the retarding coil 23 of the lower circuit consists of many turns of fine wire. These coils are arranged axially in line and a non-magnetic tube or member 38, preferably of fiber or other insulating material extends through these coils and holds the same in place. Within the fiber tube is a longitudinally movable shield 29 preferably constructed of steel so that the same is magnetic and also of tubular form. On its upper end this shield is provided with a guide, preferably a ball race 36 containing bronze balls 26 which engage with the bore of the fiber tube, thereby forming a guide for the upper end of the shield. Axially within the shield is arranged a longitudinally movable plunger, or core 28 of soft iron which is responsive to the action of the releasing coil 22. This steel tube 29 has walls of sufficient thickness to absorb such an amount of magnetic flux as to prevent the plunger 28 from being raised until a predetermined value of current is reached in the coil 22. A brass or fiber disk 35 is secured in the lower extremity of the tube 29 at a sufficient distance from this end to provide a retaining pocket or space for the helical spring 31. The latter is of sufficient strength to counterbalance the weight of the tube 29 and keeps this tube yieldingly in its extreme upper position when there is no magnetic flux existing in the circuits $M^1$ and $M^2$. The lower end of the spring 31 rests on a supporting plug 32 which is secured by a screw joint in the lower part of the frame 2.

A guide rod 30 projects downwardly from the center of the disk 35 through the plug 32 and into the cylindrical chamber 24 of a dash pot which is secured to the under side of the plug 32. Within this chamber is a piston 34 which is adjustably fastened to the lower end of the rod 30 by a screw joint, thereby forming a means of limiting the length of the stroke of the tube 29 and also dampening the movements of said tube. The cylinder 24 of the dash pot is filled with fluid such as oil or air which operates to retard the movement of the piston 34 therein and the parts connected therewith. The plunger 28 has at its lower end a guide, preferably an external ball race 37 at its lower end containing balls 27 preferably of bronze which bear against the inner wall or bore of the steel tube or shield 29. The upper end of this plunger is guided by a rod 4 secured to this end thereof and passing up through a guide plug 20 on the upper part of the frame 2. The rod 4 extends upward toward a catch or latch 6 but stops short of the same a distance less than the distance between the top of the plunger 28 and guide plug 20. The rod 4 has a brass stop disk 5 adjustably fastened thereto near its upper end preferably by a screw joint, whereby the length of the stroke of the plunger 28 can be limited as desired. The catch or latch 6 is movably attached at one end to a supporting lug 15 by means of the pin 14, the other end being left free to engage with a shoulder 7 on the breaker arm 1 of the switch, whereby the circuit to be protected may be opened or closed. The two side pieces 25, 25 of the breaker arm are movably attached by pivot pins 17, 17 to bosses on opposite sides of the frame 2. The spring 3 having its two ends secured in the holes 16, 16 in the frame 2 serves as a means for quickly forcing the breaker arm into the open position as soon as the catch or latch 6 releases said arm 1. The latter has attached to its upper part the laminated copper brush or bridge member 9 and the two carbon followers 11, 11 and also the handle 13 for manual operation of said arm. The copper brush 9 forms an electrical connection between the contact blocks 8, 8 of the switch when the breaker arm is in the closed position. The carbon blocks 10, 10 receive the arc from the followers 11, 11 whenever the circuit is opened. Cushion stops 12, 12 are provided on opposite sides of the frame and serve to limit the downward movement of the breaker arm when the circuit is opened. The four lugs 19, 19 serve as means for securing the frame 2 to the slate panel or base plate 21. Although not shown in the figures all parts of the magnetic circuit are to be laminated where necessary to protect them against eddy currents.

In Fig. 6, my improvements are embodied in a single phase electrical system. It is understood, however, that this device with the necessary adaptions, may be used in connection either with direct systems or with alternating current systems of any number of phases, and also in conjunction with motors, employing either a starting compensator, or a starting resistance in the stator or in the rotor circuit. As shown in Fig. 6, L, L represent the service lines or mains which conduct the supply of electric current and D the switch connecting the stator windings S of the electric motor R with the lines L, L. The releasing coil 22 is in series with the motor circuit, while the retarding coil 23 has its terminals connected in shunt across the terminals of the stator winding of the motor. The circuit breaker element 9 may be introduced between the switch D and the series coil 22 or any where else in the motor circuit.

The operation of the system is as follows: Before starting the breaker arm 1 is shifted by hand so as to close the switch bridge piece 9 after which the same is held in position by the catch 6. The plunger 28 at this time is in its lowest position and the steel tube 29 is in its highest position where it is held by a spring 31. Upon now closing the switch D a large amount of current rushes through the coil 22 and stator windings S. This current produces a strong flux in the magnetic circuit $M^1$. This flux holds the tube 29 in its upper position and this tube in turn acts as a magnetic shunt for the plunger 28 so that insufficient flux reaches this plunger to raise it. However, if the initial rush of current exceeds a predetermined limit the tube becomes magnetically saturated and the plunger 28 is then raised. It is thereby caused to strike the catch 6 and release the breaker arm 1, thus in the case of a short circuit, the circuit is automatically opened even in the starting position of the protecting device. However, if the starting current does not rise abnormally and subsides to the normal running value as soon as the motor has attained full speed, the flux $M^1$ is greatly reduced. At the same time the voltage across the terminals of the coil 23, has risen with the acceleration of the rotor until the line voltage has been reached at full speed and consequently the flux in circuit $M^2$ has become correspondingly strong. This shifting of the flux strength permits the tube 29 to be drawn down to its lowest position by the action of the lower coil 23 and thereby leave the plunger 28 directly exposed to the flux of circuit $M^1$. Therefore any increase above a predetermined limit of the running current will cause the plunger 28 to be raised at once and trip the circuit-opening mechanism. Meanwhile the piston 34 through the damping action of the liquid in the chamber 24 of the dash pot will prevent the steel tube 29 from rising quickly enough to shield the plunger 28 from the flux of the circuit $M^1$.

Although this device has been described in connection with an alternating current induction motor, its use is by no means limited to this one application. It may be used with direct current motors or any other apparatus requiring a starting current large in proportion to its operating current.

Instead of constructing the shield in the form of a tube, as shown in Figs. 4 and 5, substantially the same result may be obtained by making the shield solid, as shown in Fig. 7, and providing the same with a wide lower part $29^a$ which is arranged within the coil 23 and a reduced upper part $29^b$ which is arranged along one side of the plunger $28^a$ within the coil 22.

The releasing coil $22^a$ and the retarding coil $23^a$ may also be arranged side by side, as shown in Fig. 9, in which case the shield is divided, one section $29^c$ being arranged within the coil $23^a$ and the other section $29^d$ between the plunger $28^b$ and the other coil $22^a$ and a rock lever $29^e$ being employed for operatively connecting the two shield sections $29^c$, $29^d$, the operation of the same being substantially like the device shown in Fig. 4.

In the last mentioned construction the lower end of the plunger 28^b is provided with a laterally projecting hook or finger 28^c which engages with a tail 6^a on the catch 6^b for releasing the same from the shoulder of the switch breaker arm 1^a.

In the diagrammatic representation of my invention shown in Fig. 10 the same is organized to embody a relay which operates to close an independent circuit containing a circuit breaker and tripping coil. As shown in the last mentioned figure, 40 represents a releasing coil of coarse wire which is connected in series with motor stator winding 41 supplied from the main lines 42 and 42 a retarding coil of fine wire connected in shunt across the motor terminals. 44 represents a steel shield or core movable axially within the releasing and retarding coils 40, 43 and 45 a soft iron plunger or core arranged within that part of the shield contained within the releasing coil. The series circuit containing the releasing coil 40 may be opened and closed by a switch of which the pivoted bridge member or arm 46 forms a part. This switch lever 46 is provided with a latch adapted to be released by the core 47 of an auxiliary tripping coil 48 connected in shunt across the main lines 42. The tripping coil circuit is opened and closed by a switch having a movable bridge member 49 which is connected with the plunger 45. This bridge is yieldingly held in a normally open position by a spring 50. At starting the switch 46 is closed and the switch 49 open and the shield 44 covers the plunger 45 so that the latter cannot be influenced by the coil 40. When, however, the flux through the coil 43 becomes great enough to shift the shield 44 and expose the plunger to the action of the coil 40 then the latter shifts the plunger and closes the switch 49. The instant this occurs the tripping coil 48 becomes energized and opens the switch 46, thereby breaking the circuit through the motor and stopping the same.

I claim as my invention:

1. Means for protecting electrical apparatus requiring a larger current for starting than for running, comprising a circuit breaker adapted to connect said apparatus with a source of supply and having electro-responsive operating means, and electro-responsive magnetic shunting means whereby said operating means are rendered unresponsive to a predetermined overload during the starting period.

2. A protective device for electrical apparatus requiring a larger current for starting than for running, comprising a circuit breaker having a tripping coil included in a normally open circuit and adapted to connect said apparatus with a source of supply, a relay comprising a coil subjected to the current variations of the circuit, a movable core responsive to overload in said coil of the relay and adapted to connect the tripping coil with the source of supply, a retarding coil subjected to the voltage variations at the terminals of the apparatus to be protected, a movable magnetic shunt arranged to prevent said movable core from operating on the starting current, and another movable core responsive to said retarding coil and adapted to modify the influence of said shunt on said tripping core after the starting current has subsided to running value.

3. An electric circuit protecting device comprising a releasing coil adapted to be connected in series with the apparatus which is supplied with current from the main supply lines, a circuit breaker for controlling the circuit of the apparatus, a magnetic plunger responsive to the action of said releasing coil, means controlled by said plunger for operating said circuit breaker, a retarding coil connected in shunt across said circuit, a longitudinally movable magnetic shield arranged adjacent to said plunger and responsive to the action of said retarding coil, and a spring for normally holding said shield in a position in which it shunts the flux from said plunger.

Witness my hand this 27th day of September, 1913.

GEORGE R. FESSENDEN, Jr.

Witnesses:
THEO. L. POPP,
ANNA HEIGIS.